US011299633B2

(12) United States Patent
Lucic et al.

(10) Patent No.: US 11,299,633 B2
(45) Date of Patent: *Apr. 12, 2022

(54) LEUCOINDIGO SALT SOLUTION WITH VERY LOW CONTENT OF ANILINE AND METHOD OF MAKING SAME

(71) Applicant: Archroma IP GmbH, Reinach (CH)

(72) Inventors: Erwin Lucic, Singapore (SG); Jorg Hubner, Heidelberg (DE); David Hyett, Sittard (NL); Michele Catherine Christianne Janssen, Eindhoven (NL); Karin Hendrika Maria Bessembinder, Eindhoven (NL); Pierre L. Woestenborghs, Dilsen-Stokkem (BE); Marinus Petrus Wilhelmus Maria Rijkers, Elsloo (NL)

(73) Assignee: Archroma IP GmbH, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/637,874

(22) PCT Filed: Aug. 10, 2018

(86) PCT No.: PCT/EP2018/071791
§ 371 (c)(1),
(2) Date: Feb. 10, 2020

(87) PCT Pub. No.: WO2019/030391
PCT Pub. Date: Feb. 14, 2019

(65) Prior Publication Data
US 2021/0009810 A1    Jan. 14, 2021

(30) Foreign Application Priority Data

Aug. 11, 2017 (EP) ..................... 17185971
Aug. 11, 2017 (EP) ..................... 17185976
Aug. 11, 2017 (EP) ..................... 17185980
May 18, 2018 (EP) ..................... 18173343

(51) Int. Cl.
*C09B 7/02* (2006.01)
*C09B 67/54* (2006.01)
*D06P 1/22* (2006.01)
*C09B 67/44* (2006.01)
*B01D 3/14* (2006.01)

(52) U.S. Cl.
CPC ............ *C09B 7/02* (2013.01); *C09B 67/0083* (2013.01); *C09B 67/0096* (2013.01); *D06P 1/228* (2013.01); *B01D 3/14* (2013.01)

(58) Field of Classification Search
CPC ... C09B 7/02; C09B 67/0096; C09B 67/0083; C09B 7/00; C09B 68/4677; D06P 1/22; D06P 1/228; B01D 3/14
USPC ........................................................... 8/438
See application file for complete search history.

(56) References Cited

U.S. PATENT DOCUMENTS

| 2,130,878 A * | 9/1938 | Davidson .................. C09B 7/02 548/458 |
| 5,116,996 A | 5/1992 | Kohlhaupt et al. |
| 5,424,453 A | 6/1995 | Kohlhaupt et al. |
| 5,586,992 A | 12/1996 | Schnitzer et al. |
| 6,169,218 B1 | 1/2001 | Hearn et al. |
| 6,428,581 B1 | 8/2002 | Gang et al. |

FOREIGN PATENT DOCUMENTS

| CN | 1107489 A | 8/1995 |
| EP | 2083147 A1 | 7/2009 |
| GB | 2283022 A | 4/1995 |
| JP | H03016602 A | 1/1991 |
| JP | H07157684 A | 6/1995 |
| JP | H10111633 A | 4/1998 |
| JP | 2002520469 A | 7/2002 |
| JP | 2020530517 A | 10/2020 |
| JP | 2020530518 A | 10/2020 |
| TW | 444049 B | 7/2001 |
| TW | I251613 B | 3/2006 |
| WO | 2004024826 A2 | 3/2004 |
| WO | WO 2004/024826 A2 * | 3/2004 |

OTHER PUBLICATIONS

PCT Office, International Search Report issued in PCT/EP2018/071791 dated Oct. 22, 2018, 3 pages.
PCT Office, International Search Report issued in PCT/EP2018/071783 dated Oct. 22, 2018, 3 pages.
PCT Office, International Search Report issued in PCT/EP2018/071800 dated Oct. 22, 2018, 3 pages.
PCT Office, International Search Report issued in PCT/EP2018/071805 dated Nov. 12, 2018. 3 pages.
European Patent Office, Extended Search Report issued in EP 17185971 dated Feb. 7, 2018.
European Patent Office, Extended Search Report issued in EP 17185976 dated Feb. 2, 2018.
European Patent Office, Extended Search Report issued in EP 17185980 dated Feb. 2, 2018.
European Patent Office, Extended Search Report issued in EP 18173343 dated Nov. 12, 2018.

(Continued)

*Primary Examiner* — Eisa B Elhilo
(74) *Attorney, Agent, or Firm* — Wood Herron & Evans LLP

(57) ABSTRACT

Stable aqueous leucoindigo solution comprising an aromatic amine in the form of aniline or aniline and N-methylaniline, wherein said leucoindigo is in the form of an alkali metal salt;
wherein the concentration of the aromatic amine is below 40 ppm determined according to ISO 14362-1:2017(E); and wherein the concentration of the leucoindigo salt is in a concentration range of from 10 to 45% by weight based on the total weight of the solution, and wherein the stability of the solution is measured at a temperature of 23° C.; or wherein the concentration of the leucoindigo salt is in a concentration range of from 45 to 65% by weight based on the total weight of the solution, and wherein the stability of the solution is measured at a temperature of 60° C.

19 Claims, No Drawings

(56) References Cited

OTHER PUBLICATIONS

U.S. Patent and Trademark Office, Non-final Office Action issued in U.S. Appl. No. 16/637,886 dated May 13, 2021.
R. M. Price, Distillation. http://facstaff.cbu.edu/rprice/lectures/distill.html, Feb. 13, 2003.
Japanese Patent Office, Office Action issued in JP 2020-507643 dated Oct. 26, 2021.
Taiwan Patent Office, Office Action issued in TW 107127917 dated Nov. 15, 2021.
Japanese Patent Office, Office Action issued in JP 2020-507660 dated Dec. 7, 2021.
Argentina Patent Office, Office Action issued in AR 20180102290 dated Dec. 21, 2021.
Chinese Patent Office, Office Action issued in CN 201880059267.4 dated Dec. 2, 2021.

\* cited by examiner

LEUCOINDIGO SALT SOLUTION WITH VERY LOW CONTENT OF ANILINE AND METHOD OF MAKING SAME

CROSS-REFERENCE TO RELATED APPLICATIONS

The present invention is related to U.S. Ser. No. 16/637,862, filed Feb. 10, 2020, U.S. Ser. No. 16/637,886, filed Feb. 10, 2020, and U.S. Ser. No. 16/637,889, filed Feb. 10, 2020.

FIELD OF THE INVENTION

The invention is in the field of aniline-free leucoindigo salt solutions and indigo obtained therefrom.

BACKGROUND OF THE INVENTION

Indigo is a vat dye used for dyeing cellulose-containing textile materials.

For application on a textile material, indigo is subjected to reduction wherein a water-soluble leucoindigo salt is formed. This salt is then applied in aqueous solution to the textile material. Oxidation of the leucoindigo salt results in the formation of indigo, wherein the dyed textile material is obtained.

Synthetically produced indigo contains impurities based on aromatic amines entrapped therein due to the commonly used production processes, in particular aniline and/or N-methylaniline. For example, synthetically produced indigo may contain up to 6,000 ppm aniline and up to 4,000 ppm N-methylaniline. Aromatic amines such as aniline and N-methylaniline are not desired in textile applications. Thus, these impurities should be removed as far as possible from indigo, respectively the leucoindigo salt made therefrom, prior to the application on the textile material.

DE 43 36 032 A1 discloses in Example 1 a process for purifying indigo comprising extracting an aqueous leucoindigo sodium salt solution with an inert solvent under oxygen-excluding conditions, subsequently to the extraction, indigo is conventionally regenerated by oxidation. The obtained indigo is free from aniline and N-methylaniline.

WO 2004/024826 A2 suggests removing aromatic amine impurities on the stage of the aqueous leucoindigo salt solution by distillation, steam distillation, extraction or by stripping with an inert gas. This prior art discloses that the concentration of aromatic amines may be reduced below a content of 200 ppm applying the purification methods defined therein. The purified leucoindigo salt solution may then be subjected to oxidation in order to obtain indigo containing said low amounts of aromatic amines, if any. The purified leucoindigo may present on a textile material prior to the oxidation.

Example 1 of WO 2004/024826 A2 discloses a solution containing 55% by weight leucoindigo in the form of a mixed sodium and potassium salt obtained from a non-purified leucoindigo salt solution having a salt content of 23% by distillation under normal pressure, wherein in the purified solution the content of aniline is less than 200 ppm and the content of N-methylaniline is less than 20 ppm.

Example 2 discloses a solution containing 23% by weight leucoindigo in the form of a mixed sodium and potassium salt obtained from a non-purified leucoindigo salt solution by threefold extraction, wherein in the purified solution the content of aniline is 147 ppm. N-methylaniline is no longer detectable.

Example 3 discloses a solution containing 23% by weight leucoindigo in the form of a mixed sodium and potassium salt obtained from a non-purified leucoindigo salt solution by stripping with nitrogen, wherein in the purified solution the content of aniline is 113 ppm. N-methylaniline is no longer detectable.

Example 4 discloses a leucoindigo solution in the form of a mixed sodium and potassium salt obtained by steam distillation of a non-purified leucoindigo salt solution. Aniline and N-methylaniline are no longer detectable. The purified leucoindigo solution has a leucoindigo concentration of 7% by weight. This low-concentrated solution is not applicable to achieve middle or deep shades. Consequently, such leucoindigo solutions would not be of interest for applications at an industrial scale.

It is further known that for transportation and application an aqueous leucoindigo salt solution should be as stable as possible in order to prevent undesired crystallization and/or precipitation of the salt. This is in particular important if the leucoindigo salt is present in the aqueous medium in a relative high concentration. Concentrated leucoindigo salt solutions are advantageous in the vat dying process due to a reduced wastewater contamination.

In this respect, WO 00/04100 suggests providing an aqueous leucoindigo solution in the form of a mixed sodium and potassium salt, wherein the mole-% of sodium is in the range of from 70 to 30, and the mole-% of potassium is correspondingly in the range of from 30 to 70. This corresponds to a molar ratio of sodium to potassium in the range of from 2.33:1 to 1:2.33. Within said range, despite a relative high concentration of the leucoindigo salt of from 25 to 40% by weight, said dissolved leucoindigo salt solution is stable at room temperature, or is stable at an increased temperature in the range of from 40 to 60° C. in case of a concentration between 50 and 55% by weight, i.e. the salt is not prone to crystallization or precipitation. This prior art further discloses a molar ratio of sodium to potassium in the range of from 3:1 to 1:3, which corresponds to a mole-% range of sodium of from 75 to 25, and potassium of from 25 to 75.

WO 00/04100 further discloses with reference to WO 94/23114 that a solution of leucoindigo in the form of a sodium salt is stable up to a concentration of 20% by weight at room temperature.

WO 00/04100 further discloses in Example 4 that from diluted leucoindigo solutions water may be distilled off in order to concentrate them. E.g., from a solution having a concentration of 25% by weight of leucoindigo salt, approx. 44% by weight water may be distilled off in order to concentrate the solution up to 45% by weight.

Example 5 of WO 00/04100 discloses that from an aqueous solution containing 20% by weight leucoindigo salt about 34% water is distilled off in order to concentrate the solution to 45% by weight.

WO 00/04100 is silent regarding aniline and N-methylaniline concentrations.

OBJECTS OF THE INVENTION

There is an ongoing need in the industry for providing concentrated leucoindigo salt solutions in which the content of said aromatic amine is as low as possible. Thus, the problem to be solved by the present the invention was to provide purified concentrated leucoindigo salt solutions and indigo made therefrom having an aniline content of far below 200 ppm, i.e. at least less than 100 ppm and in particular at least less than 40 ppm or 30 ppm, preferably less than 20 or 10 ppm or less than 5 ppm or even 0 ppm.

SUMMARY OF THE INVENTION

The inventors discovered that the amount of water which is distilled off from an aqueous leucoindigo salt solution has a crucial influence on the residual amount of aromatic amine in the leucoindigo solution. The inventors discovered that aqueous leucoindigo solutions having a very low content of aromatic amine such as aniline and N-methylaniline may be prepared if water is added to a non-purified leucoindigo solution commonly used in the industry and comprising said amine in order to obtain a diluted leucoindigo solution, and subsequently water is distilled off in a weight which at least equals the weight of said aqueous leucoindigo solution prior to the addition of water. The more water is added and is subsequently distilled off the lower is the content of aromatic amine. The thus obtained concentrated solutions contain less than 40 ppm aromatic amine, preferably less than 30 ppm, or less than 20 ppm or less than 10 ppm. In a preferred embodiment, concentrated solutions may be prepared in which said aromatic amine is no longer detectable. Such solutions may be termed as aniline-free. Accordingly, the term "less than 100 ppm and in particular less than 40 ppm or less than 30 ppm or less than 20 ppm or less than 10 ppm" encompasses as lower limit a limit at which the aromatic amine is no longer detectable, i.e. 0 ppm measured according to ISO 14362-1:2017(E).

A further particular advantage of the method according to the invention is that concentrated solutions may be prepared, e.g. in the range of from 10 to 65% by weight such as 15 to 60% by weight or 20 to 55% by weight or 25 to 50% by weight, which comply with the dyeing requirements in terms of middle and deep shades, and which are aniline-free. Also the requirements of a reduced wastewater contamination in dyeing factories may be met.

Accordingly, the invention relates to the following items:
1. Method of removing an aromatic amine in the form of aniline or aniline and N-methylaniline from an aqueous leucoindigo solution comprising said aromatic amine in order to obtain a purified leucoindigo solution, wherein said leucoindigo is in the form of an alkali metal salt, the method comprising steps (A) and (B):
   (A) adding water to the aqueous leucoindigo solution in order to obtain a diluted leucoindigo solution; and
   (B) subjecting the diluted aqueous leucoindigo solution obtained in step (A) to distillation such that water is distilled off in a weight which at least equals the weight of said aqueous leucoindigo solution used in step (A).
2. Method of making an aqueous aniline-free or aniline-free and N-methylaniline-free leucoindigo solution from an aqueous leucoindigo solution comprising aniline or aniline and N-methylaniline, the concentration of aniline or aniline and N-methylaniline being determined according to ISO 14362-1:2017(E), wherein said leucoindigo is in the form of an alkali metal salt, the method comprising steps (A) and (B):
   (A) adding water to the aqueous leucoindigo solution in order to obtain a diluted leucoindigo salt solution; and
   (B) subjecting the diluted aqueous leucoindigo solution obtained in step (A) to distillation such that water is distilled off in a weight which at least equals the weight of said aqueous leucoindigo solution used in step (A).
3. Method of item 1 or 2, wherein the concentration of the leucoindigo salt in the solution used in step (A) is in the range of from 5 to 65% by weight, based on the total weight of the solution.
4. Method of any one of items 1 to 3, wherein the concentration of said aromatic amine in the solution used in step (A) is in the range of from 2,000 ppm to 10,000 ppm.
5. Method of any one of the preceding items, wherein the concentration of aniline in the solution used in step (A) is in the range of from 1,000 ppm to 3,000 ppm and the concentration of N-methylaniline is in the range of from 500 to 2,000 ppm.
6. Method of any one of the preceding items, wherein in step (A) water is added in a weight sufficient to allow in step (B) distilling off water in a weight which at least is one and half times the weight of said aqueous leucoindigo solution used in step (A).
7. Method of any one of the preceding items, wherein in step (A) water is added in a weight sufficient to allow in step (B) distilling off water in a weight which at least is twice the weight of said aqueous leucoindigo solution used in step (A).
8. Method of any one of the preceding items, wherein in step (B) distillation is performed under a flow of inert gas.
9. Method of any one of the preceding items, wherein the weight of water added in step (A) and the water distilled off in step (B) are selected such that after step (B) the concentration of the leucoindigo salt in the purified solution is in the range of from 40 to 65% by weight, based on the total weight of the solution.
10. Method of item 9, wherein the concentration is adjusted to a range of from 10 to 45% by weight, if necessary by addition of water.
11. Method of any one of the preceding items, wherein step (A) comprises:
    (α) providing a liquid stream comprising said aqueous leucoindigo solution comprising said amine(s);
    (β) providing a water stream;
    (γ) bringing into contact said liquid stream with said water stream.
12. Method of item 11, wherein step (γ) comprises steps (γ1) and (γ2), and step (B) comprises steps (δ) and (ε):
    (γ1) feeding said liquid stream and
    (γ2) feeding said water stream into a distillation column configured to bring into contact said liquid stream with said aqueous stream;
    (δ) discharging from the distillation column water comprising aniline or aniline and N-methylaniline; and
    (ε) discharging from the distillation column an aqueous aniline-free or aniline-free and N-methylaniline-free leucoindigo solution.
13. Method of item 11 or 12, wherein said (γ1) liquid stream and said (γ2) water stream are fed into the column via inlets in the sidewalls of the column, and said (δ) water comprising aniline or aniline and N-methylaniline is discharged at the top of the column, and the (ε) aqueous aniline-free or aniline-free and N-methylaniline-free leucoindigo solution is discharged at the bottom of the column.
14. Method of any one of the preceding items, wherein the distillation column is a column provided with trays or packing materials.
15. Stable aqueous leucoindigo solution comprising an aromatic amine in the form of aniline or aniline and N-methylaniline, wherein said leucoindigo is in the form of an alkali metal salt;

wherein the concentration of the aromatic amine is below 40 ppm determined according to ISO 14362-1:2017(E); and wherein the concentration of the leucoindigo salt is in a concentration range of from 10 to 45% by weight based on the total weight of the solution, and wherein the stability of the solution is measured at a temperature of 23° C.; or wherein the concentration of the leucoindigo salt is in a concentration range of from 45 to 65% by weight based on the total weight of the solution, and wherein the stability of the solution is measured at a temperature of 60° C.

16. Stable aqueous leucoindigo solution of item 15, wherein the concentration of the aromatic amine is below 30 ppm or below 20 ppm.
17. Stable aqueous leucoindigo solution of item 15 or 16, wherein the concentration of the aromatic amine is below 10 or 5 ppm.
18. Stable aqueous leucoindigo solution as defined in any one of items 15 to 17, obtainable by a method as defined in item 9 or 10 or any one of items 11 to 14 as far as depending on item 9 or 10.
19. Method of making indigo, comprising step (D):
    (D) oxidizing the aqueous leucoindigo solution as defined in any one of items 15 to 18.
20. Method of item 19, comprising step (C) prior to step (D):
    (C) treating a textile with the leucoindigo solution as defined in any one of items 15 to 18.
21. Method of making indigo, comprising steps (I) and (III):
    (I) performing a method as defined in any one of items 1 to 14, preferably items 9 or 10 or any one of items 11 to 14 as far as depending on item 9 or 10;
    (III) oxidizing the leucoindigo solution obtained in step (I).
22. Method of item 21, comprising step (II) prior to step (III):
    (II) treating a textile with the leucoindigo solution obtained in step (I).

DETAILED DESCRIPTION OF THE INVENTION

The term "aniline-free" as used in this disclosure encompasses in its broadest meaning an aniline concentration below 200 ppm, or below 100 ppm, preferably below 80 ppm, more preferred below 60 ppm, still more preferred below 40 ppm, in particular below 30 ppm or below 20 ppm, and particularly preferred below 10 ppm or below 5 ppm, the concentration being determined according to ISO 14362-1:2017(E).

The term "aniline-free and N-methylaniline-free" as used in this disclosure defines an aniline concentration and an N-methylaniline concentration below 200 ppm or 100 ppm, preferably below 80 ppm, more preferred below 60 ppm, still more preferred below 40 ppm, in particular below 30 ppm or below 20 ppm, and particularly preferred below 10 ppm or below 5 ppm, the concentration being determined according to ISO 14362-1:2017(E).

Methods According to the Invention

According to a first aspect, the invention relates to a method of removing an aromatic amine in the form of aniline or aniline and N-methylaniline from an aqueous leucoindigo solution comprising said aromatic amine in order to obtain a purified leucoindigo solution, wherein said leucoindigo is in the form of an alkali metal salt, the method comprising steps (A) and (B):

(A) adding water to the aqueous leucoindigo solution in order to obtain a diluted leucoindigo solution; and
(B) subjecting the diluted aqueous leucoindigo solution obtained in step (A) to distillation such that water is distilled off in a weight which at least equals the weight of said aqueous leucoindigo solution used in step (A).

According to a second aspect, the invention relates to a method of making an aqueous aniline-free or aniline-free and N-methylaniline-free leucoindigo solution from an aqueous leucoindigo solution comprising aniline or aniline and N-methylaniline, the concentration of aniline or aniline and N-methylaniline being determined according to ISO 14362-1:2017(E), wherein said leucoindigo is in the form of an alkali metal salt, the method comprising steps (A) and (B):

(A) adding water to the aqueous leucoindigo solution in order to obtain a diluted leucoindigo salt solution; and
(B) subjecting the diluted aqueous leucoindigo solution obtained in step (A) to distillation such that water is distilled off in a weight which at least equals the weight of said aqueous leucoindigo solution used in step (A).

The leucoindigo solution used in step (A) is prepared according to methods known in the art, i.e. by subjecting an aqueous composition comprising indigo to a step of reduction in the presence of alkali metal hydroxide.

Accordingly, the method according to the invention comprises step (0) prior to step (A):

(0) subjecting an aqueous composition comprising indigo which contains an aromatic amine in the form of aniline or aniline and N-methylaniline, to reduction in the presence of an alkali metal hydroxide in order to generate an aqueous leucoindigo solution comprising said aromatic amine, wherein said leucoindigo is in the form of an alkali metal salt.

Preferably, reduction is performed as hydrogenation. Hydrogenation may be performed by methods known in the art.

A preferred reduction is hydrogenation using Raney-Nickel as catalyst.

Other known methods are e.g. reduction using sodium dithionite, reduction by electrolysis such as indirect electrolysis using triethanolamine complexes of iron as mediators, reduction using indoxyl or hydroxyacetone. It should be understood that the reduction is not limited to the mentioned reduction methods.

According to the invention, said leucoindigo is in the form of an alkali metal salt.

The term "alkali metal" encompasses lithium, sodium and potassium and combinations of two or three thereof.

Accordingly, in one embodiment, the alkali metal may be lithium or sodium or potassium.

In another embodiment, the alkali metal may be lithium and sodium, or lithium and potassium, or sodium and potassium.

In another embodiment, the alkali metal is lithium, sodium and potassium.

The term "lithium, sodium, and potassium" means the respective cations thereof.

The amount of alkali metal in the leucoindigo salt essentially corresponds to an amount which stoichiometrically corresponds to the amount which is necessary for the complete formation of the leucoindigo salt. Preferably, the salt and/or the solution contains from 1.5 to 2.5 mole alkali per mole leucoindigo, more preferably of from 2.0 to 2.5 mole alkali, still more preferred of from 2.1 to 2.5 mole alkali.

In one embodiment, the salt is a sodium salt, e.g. the salt disclosed in WO 94/23114.

In one embodiment, the salt is in the form of a mixed alkali metal salt such as a mixed sodium and potassium salt.

In one embodiment, sodium and potassium are present in a molar ratio as disclosed in WO 00/004100, e.g. in a molar ratio of from 2.33:1 to 1:2.33.

In another embodiment, sodium and potassium are present in a molar ratio of from 3:1 to 1:3.

In another embodiment, sodium and potassium are present in a molar ratio of from above 3:1 to 10:1 such as 4:1 to 8:1 or 5:1 to 7:1.

The person skilled in the art is capable of selecting suitable concentration ranges in which the respective purified leucoindigo solutions made from the non-purified leucoindigo solutions are stable depending on the used molar ratios.

Thus, within the addressed molar ranges of sodium to potassium, stable and concentrated solutions may be prepared.

In a preferred embodiment, the leucoindigo salt is provided in the form of a mixed alkali metal salt, preferably a mixed sodium and potassium salt, further preferably in a molar ratio of sodium to potassium in the range of from 2.33:1 to 1:2.33.

It is possible to provide the required amount of alkali metal hydroxide at once prior to the hydrogenation or in portions during the hydrogenation, or prior and during the hydrogenation. If necessary, additional alkali may also be added after the hydrogenation.

The concentration of the salt obtained after step (0) or used in step (A) can be chosen within broad boundaries and is not restricted to particular requirements.

In one embodiment, the concentration of the leucoindigo salt in the solution obtained in step (0) or used in step (A) is in the range of from 5 to 65% by weight, based on the total weight of the solution obtained in step (0) or used in step (A) such as 10 to 65% by weight or 15 to 60% by weight or 20 to 55% by weight or 25 to 50% by weight or 25 to 45% by weight.

In another embodiment, the concentration of the leucoindigo salt in the solution obtained in step (0) or used in step (A) is in the range of from 10 to 35% by weight, based on the total weight of the solution obtained in step (0) or used in step (A).

As discussed in the Background section, a leucoindigo salt solution obtained by reduction of indigo contains an aromatic amine in the form of aniline or aniline and N-methylaniline stemming from the commonly used production processes of indigo.

In one embodiment, the concentration of said aromatic amine in the solution obtained in step (0) or used in step (A) prior to purification according to step (B) is in the range of from 2,000 ppm to 10,000 ppm.

In one embodiment, the concentration of aniline is in the range of from 1,000 ppm to 3,000 ppm and the concentration of N-methylaniline is in the range of from 500 to 2,000 ppm.

According to the invention, in step (A) water is added in a weight sufficient to allow in step (B) distilling off water in a weight which at least equals the weight of said aqueous leucoindigo solution used in step (A). This means nothing else than that after distillation according to step (B) still an aqueous solution is obtained, i.e. a composition which still contains water and forms a solution, at least at distillation temperature.

The method according to step (B) is preferably performed as a batch process or as a continuous process.

During distillation according to step (B), said aromatic amine is removed together with water as an azeotropic mixture or as a mixture comprising water and amine(s).

In a further preferred embodiment, in step (A) water is added in a weight sufficient to allow in step (B) distilling off water in a weight which at least is one and half times the weight of said aqueous leucoindigo solution used in step (A).

In a particular preferred embodiment, in step (A) water is added in a weight sufficient to allow in step (B) distilling off water in a weight which at least is twice the weight of said aqueous leucoindigo solution used in step (A).

In another embodiment, in step (A) water is added in a weight sufficient to allow in step (B) distilling off water in a weight which at least is thrice the weight of said aqueous leucoindigo solution used in step (A).

In still another embodiment, in step (A) water is added in a weight sufficient to allow in step (B) distilling off water in a weight which is not more than four times the weight of said aqueous leucoindigo solution used in step (A).

In a further preferred embodiment, in step (A) water is added in a weight sufficient to allow in step (B) distilling off water in a weight which at least equals the weight of said aqueous leucoindigo solution used in step (A), and is not more than four times the weight of said aqueous leucoindigo solution used in step (A).

In a further preferred embodiment, in step (A) water is added in a weight sufficient to allow in step (B) distilling off water in a weight which at least is one and half times the weight of said aqueous leucoindigo solution used in step (A), and is not more than four times the weight of said aqueous leucoindigo solution used in step (A).

In a particular preferred embodiment, in step (A) water is added in a weight sufficient to allow in step (B) distilling off water in a weight which at least is twice the weight of said aqueous leucoindigo solution used in step (A); and is not more than four times the weight of said aqueous leucoindigo solution used in step (A).

In another embodiment, in step (A) water is added in a weight sufficient to allow in step (B) distilling off water in a weight which at least is thrice the weight of said aqueous leucoindigo solution used in step (A), and is not more than four times the weight of said aqueous leucoindigo solution used in step (A).

In still another embodiment, in step (A) water is added in a weight sufficient to allow in step (B) distilling off water in a weight which is not more than four times the weight of said aqueous leucoindigo solution used in step (A).

Distillation may be performed according to methods known in the art using known and suitable distillation devices.

In one embodiment, distillation may be performed at reduced pressure.

In one embodiment, distillation may be performed at elevated pressure.

In a preferred embodiment, the distillation is performed at normal pressure.

It is preferred to exclude presence of oxygen during distillation in order to avoid an untimely oxidation of leucoindigo to indigo. Therefore, distillation according to step (B) should be performed under inert gas such as nitrogen.

In one embodiment, in step (B) distillation is performed under a flow of inert gas, i.e. the aqueous solution subjected to distillation is at the same time stripped.

A suitable inert gas or stripping gas is nitrogen.

In a preferred embodiment, distillation is performed using a distillation column.

Distillation According to Step (B) Using a Distillation Column

The term "distillation column" as used herein is synonymously used with terms such as "distillation tower", "rectification column" or "rectification tower", "fractionating column" or "fractionating tower".

The term "column" as used herein encompasses in its broadest meaning a vertical cylindrical column.

The term "column" further encompasses a hollow structural element, preferably a hollow cylindrical element, wherein the length exceeds the diameter. Neither the diameter nor the length are limited. In one embodiment, length and diameter or the ratio of length to diameter of the column may be freely selected or may be optimized in view of the result to be achieved.

Preferred columns have a diameter of from 0.1 to 4 meters such as 0.30 meters to 3 meters and lengths ranging from about 1 meter to 50 meters such as 1 to 30 meters.

In one embodiment, the diameter is in the range of from 0.1 to 4 meters and the length is in the range of from 1 to 30 meters.

In one embodiment, distillation using a distillation column is discussed in the following when operating the column either in the batch or in a continuous mode.

According to the invention, both modes require steps (A) and (B) according to the invention, i.e. that water is added to the aqueous leucoindigo solution in order to obtain a diluted leucoindigo solution according to step (A), which is subjected to distillation according to step (B) such that water is distilled off in a weight which at least equals the weight of said aqueous leucoindigo solution employed in the dilution step.

Typically, the purified leucoindigo solution is obtained at or from the bottom of the distillation column, whereas water comprising amine(s) is obtained at or from the top of the column.

In one embodiment, steps (A) and (B) are performed one after another, i.e. at first a diluted aqueous leucoindigo solution is prepared according to step (A) which subsequently is distilled according to step (B).

In another embodiment, steps (A) and (B) are performed simultaneously, i.e. a diluted aqueous leucoindigo solution is prepared according to step (A) which simultaneously is distilled according to step (B).

In one embodiment, step (A) is performed outside the distillation column.

Accordingly, in one embodiment, a diluted leucoindigo solution obtained according to step (A) is fed to the distillation column and is distilled according to step (B).

In one embodiment, when the method is performed in a batch mode, the diluted leucoindigo solution obtained in step (A) may be fed to the bottom of the column, which then is subjected to distillation. As soon as water has been distilled off in a weight that at least equals the weight of the aqueous leucoindigo solution used in step (A), distillation may be terminated. The purified leucoindigo solution, respectively the produced leucoindigo solution, may then be discharged from the bottom of the column.

In another embodiment, when the method is performed in a continuous mode, the diluted leucoindigo solution obtained according to step (A) may be fed to the column, wherein simultaneously water [comprising the amine(s)] is distilled off, and wherein further simultaneously purified leucoindigo solution, respectively the leucoindigo solution to be made, is discharged from the bottom of the column.

In another embodiment, step (A) is performed in the column.

Subsequently, the diluted leucoindigo solution obtained according to step (A) may be distilled according to step (B) in a batch mode.

In another embodiment, when the method is performed in a continuous mode, the leucoindigo solution to be purified is fed to the column, wherein simultaneously water is also fed to the column in order to perform step (A), wherein further simultaneously water [comprising the amine(s)] is distilled off, and wherein further simultaneously purified leucoindigo solution, respectively the leucoindigo solution to be made, is discharged at or from the bottom of the column.

Inside the column, the down-flowing reflux liquid provides cooling and condensation of up-flowing vapors thereby increasing the efficacy of the column. The more reflux, the better is the column's separation of lower boiling materials from higher boiling materials.

During distillation, said aromatic amine(s) is/are removed together with water at or near the top of the column, i.e. overhead, wherein amine and water or steam are typically condensed and collected.

In one embodiment, some of the water and amine(s) condensed and collected at the top of the column are re-fed into the column at the top of the column, where it is used to knock down droplets and optionally solids, which are to leave the column. This knocking down can be done using preferably a trayed section, although also a structured packing section might be used.

The condensate may be separated in an aqueous phase, comprising water and aniline.

In one embodiment, said purified leucoindigo solution obtained at or from the bottom of the distillation column is re-fed to the column and re-distilled.

In one embodiment, the column is operated at a continuous steady state. Unless disturbed by changes in feed, heat, ambient temperature, or condensing, the amount of feed being added normally equals the amount of product being removed.

In a preferred embodiment, the amount of heat entering the column with the feed is adjusted such that it equals the amount of heat removed by the overhead overhead fractions and with the products. By carefully adjustment, foaming, weeping, entrainment, or flooding may be prevented or at least reduced to a tolerable level.

In view of the foregoing, in one embodiment, step (A) comprises steps (α) to (γ):
(α) providing a liquid stream comprising said aqueous leucoindigo solution comprising said amine(s);
(β) providing a water stream;
(γ) bringing into contact said liquid stream with said water stream.

In another embodiment, step (B) comprises steps (δ) and (ε):
(δ) discharging from the distillation column water comprising aniline or aniline and N-methylaniline; and
(ε) discharging from the distillation column an aqueous aniline-free or aniline-free and N-methylaniline-free leucoindigo solution.

In one embodiment, the invention relates to a method of removing an aromatic amine in the form of aniline or aniline and N-methylaniline from an aqueous leucoindigo solution comprising said aromatic amine in order to obtain a purified leucoindigo solution, wherein said leucoindigo is in the form of an alkali metal salt, or relates to a method of making an aqueous aniline-free or aniline-free and N-methylaniline-free leucoindigo solution from an aqueous leucoindigo solution comprising aniline or aniline and N-methylaniline, the concentration of aniline or aniline and N-methylaniline being determined according to ISO 14362-1:2017(E), wherein said leucoindigo is in the form of an alkali metal salt, the methods comprising steps (A) and (B), respectively, wherein said step (A) comprises steps ($\alpha$), ($\beta$), ($\gamma$1) and ($\gamma$2), and step (B) comprises steps ($\delta$) and ($\varepsilon$):

($\alpha$) providing a liquid stream comprising said aqueous leucoindigo solution comprising said amine(s);

($\beta$) providing a water stream;

($\gamma$1) feeding said liquid stream and ($\gamma$2) feeding said water stream into a distillation column configured to bring into contact said liquid stream with said water stream;

($\delta$) discharging from the distillation column water comprising aniline or aniline and N-methylaniline; and ($\varepsilon$) discharging from the distillation column an aqueous aniline-free or aniline-free and N-methylaniline-free leucoindigo solution.

According to the invention, step ($\alpha$) requires providing a liquid stream comprising said aqueous leucoindigo solution comprising said amine(s). Said providing preferably is performed by discharging a leucoindigo salt solution from a respective storage container or directly from a reduction device in which the leucoindigo salt solution is made by reduction of indigo. The discharged solution is in a flowing condition, e.g. either under the influence pressure, gravity or a pump, and thus forms a stream. Preferably, the flow of the solution is directed via a pipe to the distillation column used in step ($\gamma$1).

Further according to the invention, step ($\beta$) requires providing a water stream. Said providing preferably is performed by discharging water from a respective storage container or reservoir. The discharging water is in a flowing condition, e.g. either under the influence pressure, gravity or a pump, and thus forms a stream. Preferably, the flow of the water is directed via a pipe to the distillation column used in step ($\gamma$2).

The term "water stream" provided in step ($\beta$) denotes any water stream comprising water being suitable to remove from or at least to lower the content of aniline or aniline and N-methylaniline in a leucoindigo solution comprising said amine(s), wherein said leucoindigo is in the form of a salt.

In one embodiment, the amount of heat entering the distillation column generated from the water stream fed according to step ($\gamma$2) and heat entering with the liquid stream fed according to step ($\gamma$1) is controlled such that it equals the amount of heat removed in steps ($\delta$) and ($\varepsilon$) since addition of excess or insufficient heat to the distillation column can lead to foaming or flooding. Accordingly, the method is performed such to achieve adiabatic conditions.

In another embodiment, the amount of heat entering the distillation column generated from the heated portion of said liquid stream that has been discharged from the distillation column according to step ($\varepsilon$) and heat entering with the liquid stream fed according to step ($\gamma$1) is controlled such that it equals the amount of heat removed in steps ($\delta$) and ($\varepsilon$) since addition of excess or insufficient heat to the column can lead to foaming or flooding. Accordingly, the method is performed such to achieve adiabatic conditions.

Further according to the invention, steps ($\gamma$1) and ($\gamma$2) require feeding said liquid stream and said water stream into the distillation column configured to bring into contact said liquid stream with said water stream.

In one embodiment, said distillation column comprises a liquid stream inlet or liquid stream inlets for feeding the liquid stream, and a water stream inlet or purification stream inlets for feeding the water stream.

The inlets may be provided at any location of the distillation column, i.e. the inlets may be provided at the bottom or the top or at the sidewalls of the distillation column.

In one embodiment, the liquid stream inlet(s) is/are provided at the bottom of the distillation column, and the water stream inlet(s) at the top, or vice versa.

In another embodiment, the liquid stream inlet(s) is/are provided at sidewalls of the distillation columns, and the water stream inlet(s) at the bottom or the top of the distillation column.

In another embodiment, the water stream inlet(s) is/are provided at sidewalls of the distillation column, and the liquid stream inlet(s) at the bottom or the top of the distillation column.

In a preferred embodiment, said ($\gamma$1) liquid stream and said ($\gamma$2) water stream are fed into the column via inlets in the sidewalls of the column, and said ($\delta$) water comprising aniline or aniline and N-methylaniline is discharged at the top of the column, and the ($\varepsilon$) aqueous aniline-free or aniline-free and N-methylaniline-free leucoindigo solution is discharged at the bottom of the column.

Preferably, the water stream inlet(s) and/or the liquid stream inlet(s) is/are designed in the form of a sparger or spargers. The use of perforated sheets as purification stream inlets and/or liquid stream inlets is also possible.

In one embodiment, the bringing into contact is performed such that the distillation column is partly or completely filled with liquid originating from the liquid stream, and the water stream inlet(s) is/are arranged such that the fed water stream necessarily must flow through or into the liquid.

In another embodiment, the liquid stream and water stream inlet(s) are arranged such that the streams cross each other.

In another embodiment, the bringing into contact of the streams may be performed in a counter-current manner.

In another embodiment, the bringing into contact of the streams may be performed in a co-current manner, e.g. when liquid and water inlet(s) are identical, i.e. the streams are fed via a common inlet or common inlets.

In another embodiment, the distillation column contains means for guiding the liquid stream and the water stream such that they contact one another. Such means are known in the art. Exemplarily mentioned are plates and filling materials such as Raschig rings.

The term "plate" as used herein is synonymously used with the term "tray".

The term "filling material" as used herein is synonymously used with the term "packing".

According to the invention, step ($\delta$) requires discharging from the distillation column water comprising aniline or aniline and N-methylaniline.

The result of the method according to the invention is that the concentration of aniline or aniline and N-methylaniline of the liquid discharged from the distillation column according to step ($\varepsilon$) is lower than the concentration of aniline or aniline and N-methylaniline of the liquid stream fed to the distillation column according to step ($\gamma$1) via the liquid stream inlet(s).

In a preferred embodiment, steps ($\alpha$) to ($\varepsilon$) are performed simultaneously, i.e. the process is a continuous process.

In another embodiment, the process may be performed discontinuously, i.e. as a batch process. In one embodiment, the distillation column is filled with liquid provided by the liquid stream according to step ($\gamma$1). Subsequently, steps ($\gamma$2) and ($\delta$) are performed. Subsequent to the contacting according to step (δ), the purified leucoindigo solution is discharged from the device according to step (ε). The method may be repeated.

The column used in the method of the invention comprises n theoretical stages. The term "theoretical stage" as used herein encompasses a hypothetical zone or stage in which two phases, such as the liquid phase originating from the liquid stream and the purification phase such as a vapor phase originating from the purification stream as defined herein, establishes in the column an equilibrium with each other. Such equilibrium stages may also be referred to as an equilibrium stage or an ideal stage.

The number of theoretical stages required in the method according to the invention may depend on the particular type of column used. It may be determined according to methods known in the art, taking into account the desired degree of separation of aniline or aniline and N-methylaniline in the output fraction(s), i.e. obtained in in steps (δ) and (ε). It also may depend upon the amount of reflux used.

The final design choice of the number of stages to be applied in an industrial realization may then be selected based upon an economic balance between the cost of additional stages and the cost of using a higher reflux rate.

In one embodiment, the column may have from 5 to 50 theoretical stages.

In another embodiment, the column may have from 10 to 40 theoretical stages.

In one embodiment, the column may be operated at reduced pressure.

In another embodiment, the column may be operated at a pressure substantially equal to atmospheric pressure.

In still another embodiment, the column may be operated at a pressure above atmospheric pressure.

In one embodiment, the column may work at a reduced pressure such as a pressure in the range of from $0.1*10^5$ Pa absolute (0.10 bara) to $0.95*10^5$ Pa absolute (0.95 bara). In such conditions, the temperature of the column may be set in a range of from 40° C. to 95° C.

In another embodiment, the column may work at a pressure substantially equal to atmospheric pressure, i.e. in a range of $0.95*10^5$ Pa absolute (0.95 bara) to $1.2*10^5$ Pa absolute (1.2 bara). In such conditions, the temperature of the column is typically set in a range of from 95° C. to 110° C.

In a further embodiment, the column may be operated using pressures above atmospheric pressure, optionally under a pressure of $1.2*10^5$ Pa absolute (1.2 bara) to $11*10^5$ Pa absolute (11 bara) e.g. at $7*10^5$ Pa absolute (7 bara). The temperature of the column may be then set in a range 110° C. to 190° C., e.g. in the range of 160° C. to 170° C.

The temperatures quoted are measured at the bottom of the column and are dependent upon the quantity of vapor leaving the column at the top.

For heating, in one embodiment, a space heater is used. The term "space heater" as used herein encompasses a device used to heat a single, small area, e.g. the region of the bottom of the column. Accordingly, said space heater is preferably arranged at or near the bottom of the column.

In another embodiment, upper regions of the column are heated.

In another embodiment, the bottom and the upper regions of the column are heated.

The device may be provided with defoaming means such as baffles, preferably installed in the lower part of the used column, if necessary at all.

In another embodiment, defoaming may be supported adding a defoamer to the leucoindigo solution to be purified.

Although heterogeneous defoamers such as silicon oils may be used, it is preferred to use homogeneous defoamers which are dissolved in the leucoindigo solution, and which do not negatively affect the later oxidation of the purified leucoindigo to indigo.

Specifically, according to the invention, the device used in steps (γ1) and (γ2) is selected from the group consisting of plate column, packed column, or two or more of any of said columns.

The term "plate column" as used herein is synonymously used with the term "trayed tower" or "tray column".

Plate columns and packed columns are known in the art.

In one embodiment, the column contains a sequence or sequences which is/are designed as plate column and a sequence or sequences which is/are designed as packed column in order to further optimize the method.

In another embodiment, the column contains a sequence or sequences which is/are designed as plate column and a sequence or sequences which is/are designed as packed column in order to further optimize the method.

In another embodiment, several plate columns or packed columns are connected in series in order to further optimize the method.

In another embodiment, a plate column is connected with a packed column in order to further optimize the method.

In another embodiment, a plate column is connected with a packed column and a bubble column in order to further optimize the method.

In still another embodiment, a pre-purification is performed as disclosed in the prior art, wherein the final purification is performed with the method according to the invention.

The term "pre-purification" as used herein encompasses distilling off water from a respective leucoindigo salt solution, the extraction with a suitable organic solvent, a steam distillation or the stripping with nitrogen, or two or more thereof.

It is matter of course that in the method according to the invention presence of oxygen has to be excluded in order to prevent untimely oxidation of leucoindigo to indigo.

The used columns are discussed in the following in more detail.

Plate Column

In one embodiment, the distillation column is a plate column.

In a preferred embodiment, the plate column is arranged in the form of a tower, i.e. it is arranged in a perpendicular manner.

In one embodiment, the height of the column is more than 5 meters, preferably 5 to 50 meters, and more preferred 10 to 40 meters.

In connection with a plate column, the theoretical stages are also termed as theoretical trays or theoretical plates.

In one embodiment, bubble-cap "trays" or "plates" as are known in the art are provided inside the column in order to provide good contact between the up-flowing vapor and the down-flowing liquid inside the column.

The trays or plates are preferably fabricated of circular steel plates and usually installed inside the column at intervals of about 60 to 75 cm up the height of the column.

In one embodiment, the tray is a bubble-cap tray or a valve-cap tray.

The term "bubble-cap tray" as used herein encompasses a slotted cap on a central riser, wherein the gas flows up through the riser, and reverse flow is under the cap, passes downward through the annulus between riser and cap, and finally passes into the liquid through a series of openings or slots in the lower side of the cap.

The term "valve-cap tray" as used herein encompasses a tray with perforations which are covered by liftable caps. Vapor flow lifts the caps, thus self-creating a flow area for the passage of vapor. The lifting cap directs the vapor to flow horizontally into the liquid.

In one embodiment, the tray is a perforated tray, i.e. a sieve tray. The term "sieve tray" encompasses a tray in which the desired contacting between vapor and liquid occurs as the vapor, flowing upwards through the perforations, comes into contact with the liquid flowing downwards through the perforations.

In one embodiment, contacting is achieved by installing bubble-caps or valve caps at each perforation to promote the formation of vapor bubbles flowing through a thin layer of liquid maintained by a weir on each tray.

Accordingly, in one embodiment, the trays may be selected from perforated trays, bubble-cap trays or valve-cap trays, or two or three thereof.

Perforated trays, bubble-cap trays or valve-cap trays are known in the art.

In one embodiment, the feed to the plate column comprises or is a liquid stream provided according to step ($\alpha$) and a water stream provided according to step ($\beta$) which are fed into the column according to steps ($\gamma 1$) and ($\gamma 2$). The purified leucoindigo solution is collected at the bottom of the column while the water comprising amine(s) is collected at the top. The liquid and vapor produced at the top and at the bottom may be recirculated.

The vapor collected at the top according to step ($\delta$) contains aniline or aniline and N-methylaniline which have been removed from the leucoindigo solution.

The liquid collected at the bottom according to step ($\epsilon$) contains the purified leucoindigo solution.

Packed Column

In one embodiment, the plates of the plate column as disclosed above are replaced by packed sections, i.e. by sections comprising a filling material. Accordingly, the device used for purification is then a packed column.

Accordingly, a packing material may be used in the column instead of trays, especially when low pressure drops across the column are required, as when operating under vacuum. This packing material can either be random dumped packing such as Raschig rings or structured sheet metal as is known in the art.

In one embodiment, the packings may have a regular geometry such as stacked rings, grids, or proprietary structured rings, or saddles.

Rings are e.g. Raschig rings or pall rings.

Saddles may e.g. be Intalox® saddles.

In one embodiment, the packings may have an irregular shape.

The packings may be randomly arranged in the column, wherein rings, saddles, and proprietary shades are dumped into the column and take a random arrangement.

In another embodiment, the packings may be regularly arranged in the column.

Rings, saddles or proprietary structured shades may be made from a variety of materials such as ceramics, metals, plastics, and carbon.

In one embodiment, the use of structured packings such as wire mesh or perforated sheets is also possible.

The necessary height of the packing may be determined according to methods known in the art.

In embodiment, the feed to the packed column comprises or is a liquid stream provided according to step ($\alpha$) and a purification stream such as a vapor stream provided according to step ($\beta$), which are fed into the column according to steps ($\gamma 1$) and ($\gamma 2$). The liquid is collected at the bottom of the packed column while the vapor is collected at the top. The liquid and vapor produced at the top and at the bottom may be recirculated.

The vapor collected at the top according to step ($\delta$) contains aniline or aniline and N-methylaniline which have been removed from the leucoindigo solution.

The liquid collected at the bottom according to step ($\epsilon$) contains the purified leucoindigo solution.

In one embodiment, prior to distillation performed in step (B), the concentration of indigo containing an aromatic amine in the aqueous composition used in step (A) is selected such that said leucoindigo salt is obtained in step (A) in a concentration below 25% by weight.

Accordingly, in one embodiment, the concentration of the leucoindigo salt solution used in step (B) is also below 25% by weight.

A concentration below 25% by weight may be beneficial since during distillation, water and said aromatic amine(s) are distilled off, thus the leucoindigo salt solution is purified and at the same time the solution is concentrated wherein a stable and purified concentrated leucoindigo salt solution may be obtained.

Due to the distillation of water and amine, the solution obtained in step (B) may be concentrated with respect to the solution used in step (B), respectively obtained after step (A). In one embodiment, the concentration of the leucoindigo salt in the solution obtained in step (0) or used in step (A) is in the range of from 5 to 65% by weight such as 10 to 60% by weight or 15 to 55% by weight or 20 to 50% by weight or 25 to 45% by weight, based on the total weight of the solution obtained in step (0) or used in step (A).

In one embodiment, the concentration of the leucoindigo salt in the purified solution obtained after step (B) is in the range of from 45 to 65% by weight, based on the total weight of the solution.

In one embodiment, the concentration of the leucoindigo salt in the solution obtained in step (0) or used in step (A) is in the range of from 10 to 40% by weight, and after step (B), the concentration of the leucoindigo salt in the purified solution is in the range of from 45 to 65% by weight, based on the total weight of the solution.

Thus, in one embodiment, the weight of water added in step (A) and the water distilled off in step (B) are selected such that after step (B) the concentration of the leucoindigo salt in the purified solution is in the range of from 45 to 65% by weight, based on the total weight of the solution.

The thus obtained concentrated solutions contain less than 40 ppm or less than 30 ppm aromatic amine, preferably less than 20 ppm or less than 10 ppm or even less than 5 ppm.

If necessary, the solution obtained in step (B) may be diluted to a predetermined concentration range adapted to application or stability requirements.

In one embodiment, the concentration is adjusted to a range of from 10 to 45% by weight such as 15 to 45% by weight, if necessary by addition of water. Other suitable concentration ranges are e.g. 20 to 45% by weight or 25 to 45% by weight.

It is a matter of course that upon dilution the content of aromatic amine is further decreased.

In a preferred embodiment, said aromatic amine is no longer detectable. Such solutions may be termed as aniline-free.

In one embodiment, the concentration of the leucoindigo salt is adjusted to a concentration range of from 10 to 45% by weight such as 15 to 45% by weight or 20 to 45% by weight or 25 to 45% by weight based on the total weight of the solution, in order to provide a stable leucoindigo salt solution, and wherein the stability of the solution is measured at a temperature of 23° C.

The term "stability of the solution" refers to a solution which is not prone to crystallization or precipitation at the specifies temperature.

In another embodiment, the concentration of the leucoindigo salt is in a concentration range of from 45 to 65% by weight based on the total weight of the solution, and wherein the stability of the solution is measured at a temperature of 60° C. According to a third aspect, the invention relates to a stable aqueous leucoindigo solution comprising an aromatic amine in the form of aniline or aniline and N-methylaniline, wherein said leucoindigo is in the form of an alkali metal salt;
wherein the concentration of the aromatic amine is below 40 ppm determined according to ISO 14362-1:2017(E); and
wherein the concentration of the leucoindigo salt is in a concentration range of from 10 to 45% by weight such as 15 to 45% by weight or 20 to 45% by weight or 25 to 45% by weight based on the total weight of the solution, and wherein the stability of the solution is measured at a temperature of 23° C.

In another embodiment, the invention relates to a stable aqueous leucoindigo solution comprising an aromatic amine in the form of aniline or aniline and N-methylaniline, wherein said leucoindigo is in the form of an alkali metal salt;
wherein the concentration of the aromatic amine is below 100 ppm determined according to ISO 14362-1:2017(E); and
wherein the concentration of the leucoindigo salt is in a concentration range of from 45 to 65% by weight such as 45 to 60% by weight based on the total weight of the solution, and wherein the stability of the solution is measured at a temperature of 60° C.

In a preferred embodiment, the concentration of the aromatic amine is below 40 ppm.

In a further preferred embodiment, the concentration of the aromatic amine is below 30 ppm.

In another preferred embodiment, the concentration of the aromatic amine is below 20 ppm.

In another preferred embodiment, the concentration of the aromatic amine is below 10 ppm.

In another preferred embodiment, the concentration of the aromatic amine is below 5 ppm.

In another preferred embodiment, the concentration of the aromatic amine is no longer detectable.

In one embodiment, the aqueous leucoindigo solution is obtainable by a method as defined in the first aspect or the second aspect.

The leucoindigo salt obtained in the method according to the first aspect or second aspect or the aqueous leucoindigo solution defined in the third aspect may be converted to indigo or may be used in a vat dyeing process for dyeing a textile.

Accordingly, in a fourth aspect, the invention relates to a method of making indigo, comprising step (D):
(D) oxidizing the aqueous leucoindigo solution as defined in the third aspect.

In one embodiment, the method comprises step (C) prior to step (D):
(C) treating a textile with the leucoindigo solution as defined in the third aspect.

In another embodiment, the invention relates to a method of making indigo, comprising steps (I) and (III):
(I) performing a method as defined in the first aspect or the second aspect or any embodiment defined therein;
(III) oxidizing the leucoindigo solution obtained in step (I).

In one embodiment, the method comprises step (II) prior to step (III):
(II) treating a textile with the leucoindigo solution obtained in step (I).

EXAMPLES

Example 1 (Comparative)

1,000 g of a 30% by weight leucoindigo solution (containing 6.5% by weight alkali metal, 2,495 ppm aniline and 1,480 ppm N-methylaniline) were subjected to distillation at ambient pressure. After 470 ml water had been distilled off, a 57% by weight solution was obtained. The content of aniline in the obtained concentrated solution was 173 ppm and the N-methylamine concentration was 9 ppm determined according to ISO 14362-1:2017(E).

Example 2

1,000 g water was added to 2,000 g of a 30% by weight leucoindigo solution (containing 6 to 7% by weight alkali metal, 2,380 ppm aniline and 1,375 ppm N-methylaniline). Subsequently, the composition was subjected to distillation at ambient pressure. After 2,000 ml water had been distilled off, a 60% by weight solution was obtained. The content of aniline in the obtained concentrated solution was 38 ppm and the N-methylamine concentration was 2.0 ppm determined according to ISO 14362-1:2017(E).

Example 3

2,000 g water was added to 2,000 g of a 30% by weight leucoindigo solution (containing 6.5% by weight alkali metal, 2,350 ppm aniline and 1,335 ppm N-methylaniline). Subsequently, the composition was subjected to distillation at ambient pressure. After 3,000 ml water had been distilled off, a 60% by weight solution was obtained. The content of aniline in the obtained concentrated solution was 16 ppm and the N-methylamine concentration was 0.3 ppm determined according to ISO 14362-1:2017(E).

Example 4

3,000 g water was added to 2,000 g of a 30% by weight leucoindigo solution (containing 6.5% by weight alkali metal, 2,164 ppm aniline and 1,170 ppm N-methylaniline). Subsequently, the composition was subjected to distillation at ambient pressure. After 4,000 ml water had been distilled off, a 60% by weight solution was obtained. The content of aniline in the obtained concentrated solution was 5 ppm determined according to ISO 14362-1:2017(E). N-methylamine was not detectable.

Example 5

1,000 g of the leucoindigo solution obtained in Example 4 was diluted with 500 g water to result in a 40% by weight solution. This solution had an aniline content below 5 ppm determined according to ISO 14362-1:2017(E). The solution was used in vat dyeing and provided for deep shades.

The invention claimed is:
1. Method of removing an aromatic amine in the form of aniline or aniline and N-methylaniline from an aqueous leucoindigo solution comprising said aromatic amine in order to obtain a purified leucoindigo solution, wherein said leucoindigo is in the form of an alkali metal salt, the method comprising steps (A) and (B):
- (A) adding water to the aqueous leucoindigo solution in order to obtain a diluted leucoindigo solution; and
- (B) subjecting the diluted aqueous leucoindigo solution obtained in step (A) to distillation such that water is distilled off in a weight which at least equals the weight of said aqueous leucoindigo solution used in step (A).

2. Method of claim 1, wherein the concentration of the leucoindigo salt in the solution used in step (A) is in the range of from 5 to 65% by weight, based on the total weight of the solution.

3. Method of claim 1, wherein the concentration of said aromatic amine in the solution used in step (A) is in the range of from 2,000 ppm to 10,000 ppm.

4. Method of claim 1, wherein the concentration of aniline in the solution used in step (A) is in the range of from 1,000 ppm to 3,000 ppm and the concentration of N-methylaniline is in the range of from 500 to 2,000 ppm.

5. Method of claim 1, wherein in step (A) adding water in a weight sufficient to allow in step (B) distilling off water in a weight which at least is one and half times the weight of said aqueous leucoindigo solution used in step (A).

6. Method of claim 1, wherein in step (A) adding water in a weight sufficient to allow in step (B) distilling off water in a weight which at least is twice the weight of said aqueous leucoindigo solution used in step (A).

7. Method of claim 1, wherein in step (B) distillation is performed under a flow of inert gas.

8. Method of claim 1, wherein the weight of water added in step (A) and the water distilled off in step (B) are selected such that after step (B) the concentration of the leucoindigo salt in the purified solution is in the range of from 40 to 65% by weight, based on the total weight of the solution.

9. Method of claim 8, wherein the concentration is adjusted to a range of from 10 to 45% by weight, if necessary by addition of water.

10. Method of claim 1, wherein step (A) comprises:
- ($\alpha$) providing a liquid stream comprising said aqueous leucoindigo solution comprising said amine(s);
- ($\beta$) providing a water stream;
- ($\delta$) bringing into contact said liquid stream with said water stream.

11. Method of claim 10, wherein step ($\gamma$) comprises steps ($\gamma$1) and ($\gamma$2), and step (B) comprises steps ($\delta$) and ($\epsilon$):
- ($\gamma$1) feeding said liquid stream and
- ($\gamma$2) feeding said water stream
  into a distillation column configured to bring into contact said liquid stream with said aqueous stream;
- ($\delta$) discharging from the distillation column water comprising aniline or aniline and N-methylaniline; and
- ($\epsilon$) discharging from the distillation column an aqueous aniline-free or aniline-free and N-methylaniline-free leucoindigo solution.

12. Method of claim 11, wherein said ($\gamma$1) liquid stream and said ($\gamma$2) water stream are fed into the column via inlets in the sidewalls of the column, and said ($\delta$) water comprising aniline or aniline and N-methylaniline is discharged at the top of the column, and the ($\epsilon$) aqueous aniline-free or aniline-free and N-methylaniline-free leucoindigo solution is discharged at the bottom of the column.

13. Method of claim 11, wherein the distillation column is a column provided with trays or packing materials.

14. Stable aqueous leucoindigo solution comprising an aromatic amine in the form of aniline or aniline and N-methylaniline, wherein said leucoindigo is in the form of an alkali metal salt;
- wherein the concentration of the aromatic amine is below 40 ppm; and
- wherein the concentration of the leucoindigo salt is in a concentration range of from 10 to 45% by weight based on the total weight of the solution, and wherein the stability of the solution is measured at a temperature of 23° C.; or
- wherein the concentration of the leucoindigo salt is in a concentration range of from 45 to 65% by weight based on the total weight of the solution, and wherein the stability of the solution is measured at a temperature of 60° C.,
- wherein the solution is stable if no crystallization or precipitation is present at the measured temperature.

15. Stable aqueous leucoindigo solution of claim 14, wherein the concentration of the aromatic amine is below 30 ppm.

16. Stable aqueous leucoindigo solution of claim 14, wherein the concentration of the aromatic amine is below 10 ppm.

17. Method of claim 1, further comprising
oxidizing the purified aqueous leucoindigo solution.

18. Method of claim 17, comprising, prior to oxidizing the purified aqueous leucoindigo solution,
treating a textile with the purified leucoindigo solution.

19. Method of making an aqueous aniline-free or aniline-free and N-methylaniline-free leucoindigo solution from an aqueous leucoindigo solution comprising aniline or aniline and N-methylaniline, wherein said leucoindigo is in the form of an alkali metal salt, the method comprising steps (A) and (B):
- (A) adding water to the aqueous leucoindigo solution in order to obtain a diluted leucoindigo salt solution; and
- (B) subjecting the diluted aqueous leucoindigo solution obtained in step (A) to distillation such that water is distilled off in a weight which at least equals the weight of said aqueous leucoindigo solution used in step (A).

* * * * *

UNITED STATES PATENT AND TRADEMARK OFFICE
CERTIFICATE OF CORRECTION

| | |
|---|---|
| PATENT NO. | : 11,299,633 B2 |
| APPLICATION NO. | : 16/637874 |
| DATED | : April 12, 2022 |
| INVENTOR(S) | : Erwin Lucic et al. |

It is certified that error appears in the above-identified patent and that said Letters Patent is hereby corrected as shown below:

In the Claims

Column 19, Lines 42-43, Claim 10, "($\delta$) bringing into contact said liquid stream with said water stream." should be --($\gamma$) bringing into contact said liquid stream with said water stream.--.

Signed and Sealed this
Fourteenth Day of June, 2022

*Katherine Kelly Vidal*

Katherine Kelly Vidal
*Director of the United States Patent and Trademark Office*